R. SEIDERS.
Horse-Hitching Device.

No. 224,560. Patented Feb. 17, 1880.

Witnesses
Frank A. Brooks
D. H. Rourse

Inventor
Reuben Seiders
By Dewey & Co.
Attys

UNITED STATES PATENT OFFICE.

REUBEN SEIDERS, OF SAN FRANCISCO, CALIFORNIA.

HORSE-HITCHING DEVICE.

SPECIFICATION forming part of Letters Patent No. 224,560, dated February 17, 1880.

Application filed July 17, 1879.

*To all whom it may concern:*

Be it known that I, REUBEN SEIDERS, of the city and county of San Francisco, and State of California, have invented an Automatic Horse-Hitching Device; and I hereby declare the following to be a full, clear, and exact description thereof.

My invention relates to an improved device for securing horses at points where it is necessary to leave them; and it consists in the employment of a rod, one end of which may be dropped upon the ground at will. The other end is hinged to a slide which moves in a hollow barrel or guide, said guide being secured beneath the vehicle in a horizontal position. A rod is secured to the slide and extends toward the front,'having a loop or ring, to which a line may be attached and led to the horse's bit.

When a stop is made the hinged rod may be let down so that its end rests upon the ground, and any forward movement of the horse will draw the sliding rod back into the tube or guide, thus pulling upon the rein or line and the horse's mouth. A spring in the rear of the tube forces the rod forward when the horse backs or the strain is relieved.

Figure 1:
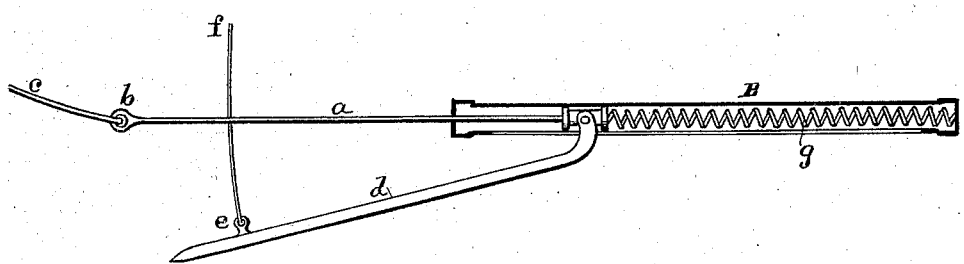
Figure 2:
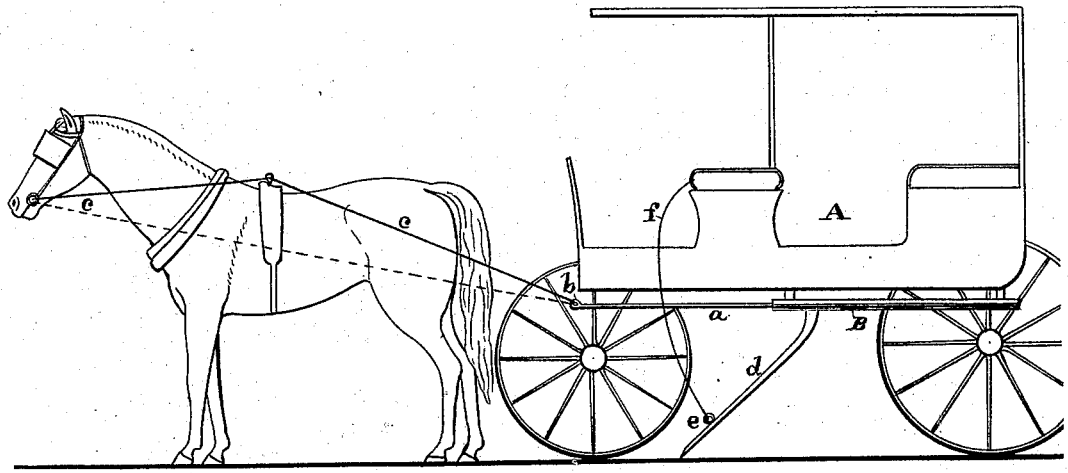

Figure 1 is a view of my device. Fig. 2 shows its application.

Let A represent the vehicle, under the body of which the hollow barrel or guide B is fixed in any convenient position parallel with the reach. Inside this barrel is fitted a slide or rod, $a$, on the outer end of which is a ring, $b$, to which is secured the end of a line or rein, $c$. This line or rein is led forward, divided, and each of the two parts secured to one ring of the horse's bit, as shown.

On the rear end of the slide or bar is hinged a rod, $d$, moving in a slot in the barrel, which may be sharpened on its forward end, and which is provided with a loop, $e$, through which a cord, $f$, may be rove, to haul it up from the inside of the vehicle, so it will be lifted from the ground and hang parallel with the guide, for the purpose hereinafter described.

In the rear end of the barrel and behind the slide is a coiled spring, $g$, for pushing the slide forward after it is pushed back.

When it is desired to hitch the horse in stopping anywhere, the hitching rein or strap $c$ is looped over or fastened to the ring $b$ on the end of the slide $a$. The cord $f$ is then released, and the hinged rod $d$ dropped. The lower end of this rod then rests on the ground, the rod being on an incline or angle forward. Should the horse attempt to move ahead this rod will push the slide in the barrel or guide back, thus pulling on the hitching-rein and stopping him. The farther he moves ahead the harder will it pull, since the lower end of the rod is immovable in the ground and holds the slide back as the vehicle moves ahead.

On feeling the strain on the bit the horse will naturally back again, and as he does the spring in the barrel pushes the slide forward and relieves the strain on the hitching-rein.

When it is desired to move, the rod $d$ is drawn up under the bottom of the vehicle by means of the cord which leads to the driver's seat, and the hitching-line hangs slack, ready for use at any time.

In this way the horse may be hitched at any point, and it will be impossible for him to run away. As soon as he begins to back, at any time when too much strain is put on the line, the strain is removed.

The device may be applied to vehicles of any class.

It will be manifest that the slide may move upon a simple rod and the tube be dispensed with, and that various modifications may be made without materially altering its construction.

I am aware that a rein-holder consisting of a bar or lever pivoted at one end to a vehicle and formed on the other end to hold on the ground, and having a sliding or compensating rod and a strap for connecting said bar with a rein, is old, and such I distinctly disclaim as my invention; but,

Having thus described my invention, what I claim as new, and desire to secure by Letters Patent, is—

The horse-hitching apparatus consisting of the barrel or guide B, placed under the body of the vehicle and provided with a slide, $a$, moving in front of a coiled spring in the horizontal stationary barrel, and fitted to hold a hitching-line, c, leading to the horse's bit, said slide being provided with the hinged rod d, adapted to be lowered to the ground by means of the cord f, and so arranged that any forward movement of the horse will be prevented, substantially as and for the purpose herein described.

In witness whereof I have hereunto set my hand.

REUBEN SEIDERS.

Witnesses:
S. H. NOURSE,
FRANK A. BROOKS.